United States Patent [19]

Horii et al.

[11] Patent Number: 4,912,748

[45] Date of Patent: Mar. 27, 1990

[54] INFRARED INTRUSION DETECTOR WITH A PLURALITY OF INFRARED RAY DETECTING ELEMENTS

[75] Inventors: Takashi Horii; Hiroshi Matsuda; Hidekazu Himezawa; Shinji Kirihata; Tsunehiko Araki, all of Kadoma, Japan

[73] Assignee: Matsushita Electric Works, Ltd., Japan

[21] Appl. No.: 248,129

[22] Filed: Sep. 23, 1988

[30] Foreign Application Priority Data

Sep. 26, 1987 [JP] Japan ................................ 62-242090

[51] Int. Cl.⁴ ......................... G01J 5/18; G08B 13/18

[52] U.S. Cl. .................................... 250/221; 250/342; 340/567

[58] Field of Search .................. 250/221, 222.1, 338.1, 250/338.3, 342, 349, 353; 340/565, 567, 541

[56] References Cited

U.S. PATENT DOCUMENTS

| | | | |
|---|---|---|---|
| 4,614,938 | 9/1986 | Weitman | 340/567 |
| 4,618,854 | 10/1986 | Miyake et al. | 340/567 |
| 4,697,081 | 9/1987 | Baker | 250/342 |
| 4,704,533 | 11/1987 | Rose et al. | 250/342 |
| 4,746,910 | 5/1988 | Pfister et al. | 340/567 |

FOREIGN PATENT DOCUMENTS

| | | |
|---|---|---|
| 58-213396 | 12/1983 | Japan . |
| 59-94094 | 5/1984 | Japan . |
| 61-100685 | 5/1986 | Japan . |

*Primary Examiner*—Edward P. Westin

*Attorney, Agent, or Firm*—Leydig, Voit & Mayer

[57] ABSTRACT

A personal body detecting device makes it possible to determine the presence and absence of a personal body in a detecting zone by sensing infrared rays in the zone with a plurality of infrared ray detecting elements, detecting at a discriminating means a peak level and output time in connection with respective outputs of the infrared ray detecting elements, and comparing them with each other. The personal body having reached the detecting zone in any direction thereto can be reliably detected, and a highly reliable detecting operation can be realized.

22 Claims, 13 Drawing Sheets

DETECTING AREA
D. A.
D. A.
D. A.
10A
A'
B'
C'
D'
OPTICAL MEANS
11
INFRARED RAY DETECTOR
I. R. D.
I. R. D.
I. R. D.
10
A
B
C
D
AMPLIFYING MEANS
12
SIGNAL PROCESSING MEANS
13
DISCRIMINATING MEANS
14
OUTPUT MEANS
15

10

PB
MD
DETECTING AREA
10A

PB
MD
10A

PB
MD
10A

PB
MD
A'
B'
C'
DETECTING AREA
120A

PB
MD
A'
B'
C'
120A

PB
MD
A'
B'
C'
120A $V_A$
A
$t_A$
$V_B$
B
$t_B$
$V_C$
C
$t_C$

71 OPTICAL MEANS
70 INFRARED RAY DETECTOR
A
B
C
D
72 AMPLIFYING MEANS
73 SIGNAL PROCESSING MEANS
74 DISCRIMINATING MEANS
74A
DISCRIMINATION MEANS
74B
OUTPUT TIME DISCRIMINATION MEANS
75 OUTPUT MEANS

Ta
Tmax

Tb
Tb'

Tc
Tc'

INFRARED INTRUSION DETECTOR WITH A PLURALITY OF INFRARED RAY DETECTING ELEMENTS

TECHNICAL BACKGROUND OF THE INVENTION

This invention relates to a personal body detecting device and, more particularly, to an infrared ray receiving type device for detecting personal body utilizing infrared rays radiated from human bodies at a relatively high energy level.

The personal body detecting device of the kind referred to can be effectively utilized as crime preventing device, means for administrating peoples going in and out a building or a room, and the like.

DISCLOSURE OF PRIOR ART

Generally, the infrared ray receiving type personal body detecting device is to detect the personal or human body by determining any difference in the energy level of infrared rays radiated from the personal body and detected by means of such infrared ray detecting element as pyroelectric element or the like from any of the rays radiated from such background as room floor or the like, and an improvement in the reliability of the device has been increasingly demanded due to increasing use in recent years. As the cause for any malfunction of the infrared ray receiving type personal body detecting device, there may be enumerated such phenomena as temperature change in the background within the detecting zone of the device or internal noise, any influence of such disturbing light of a larger energy as vehicle's headlights, sunlight and the like.

It has been suggested to prevent the malfunction due to such influence with a personal body detecting device in which two infrared ray detecting elements are arranged as disposed in horizontal direction for detecting a differential output with respect to a moving personal body. With this arrangement, any infrared ray energy level due to a cause of the malfunction existing across a detecting zone of the two infrared ray detecting elements does not contribute to the differential output, and the malfunction can be prevented. When, on the other hand, the personal body has moved in a direction perpendicular to the disposed direction of the infrared ray detecting elements, that is, in vertical direction where the elements are in horizontal direction, resultant outputs of the two elements cancel each other to rendering any differential output unobtainable and thus the intended detection impossible, and there has been a problem in that the detecting direction of the device is restricted. It has been another drawback that, when the infrared ray energy causing the malfunction influences only one of the two infrared ray detecting elements, the device is unable to avoid the malfunction.

In order to solve the problems involved in the device employing the two infrared ray detecting elements, there has been suggested to obtain two differential outputs by means of four infrared ray detecting elements. In this connection, it has been also suggested to employ positive side detecting elements for one half of the four detecting elements and negative side detecting elements for the other half, in order to obtain effective differential outputs. For the personal body detecting device of the type including four infrared ray detecting elements, there are enumerated such ones as disclosed in, for example, U.S. Pat. No. 3,877,308 to A. L. Taylor, Japanese Patent Application Laid-Open Publications No. 58-213396 and No. 59-94094 and U.S. Pat. No. 4,618,854 both to R. Miwake et al, and No. 61-100685 of Y. Suzuki et al. According to these devices employing the four infrared ray detecting elements where, in particular, the four detecting elements are disposed in a lattice formation, the personal body detection can be attained on the basis of the two differential outputs obtainable even when the personal body moves either in horizontal or vertical direction.

With the four element arrangement for the infrared ray detection, the influence due to the cause of the malfunction can be reduced, and the movement of the personal body both in the horizontal and vertical directions may be detected. With these known devices of the type using the four infrared ray detecting elements, however, there has been a risk that no differential outputs can be obtained in an event when the personal body moves generally in one of four directions with respect to the detecting zone respectively at an angle of substantially 45 degrees with respect to the horizontal and vertical directions, since in this event the outputs of two of the infrared ray detecting elements disposed to be perpendicular to the moving direction of the personal body cancel each other. Known devices have been demanded to be further improved in this respect in view of natural requirement that the personal body coming into the detecting zone in any direction can be detected specifically when the device is utilized as the crime preventing device. While it may be possible to solve the problem by employing the infrared ray detecting device in a pair, for example, as disposed to mutually deviate by 45 degrees, there still has remained a problem that the entire device installation becomes expensive and complicated.

TECHNICAL FIELD

Accordingly, it is the primary object of the present invention to provide a personal body detecting device capable of detecting the personal body entering the detecting zone in any direction thereto, so that the device is sufficiently improved in the reliability.

According to the present invention, this object can be attained by a personal body detecting device in which infrared rays collected from a detecting zone as condensed by an optical means are received by a plurality of infrared ray detecting elements, outputs of which elements are amplified by an amplifying means, the outputs thereby amplified are processed through a signal processing means and provided to a discriminating means for comparing therein the outputs of the respective infrared ray detecting elements with each other and the result of this comparison is provided out of an output means, which device is specifically featured in that the discriminating means detects peak level and output time of the respective outputs of the infrared ray detecting elements after being processed through the signal processing means and discriminates the presence or absence of the personal body through mutual comparison of the peak level and output time of the respective outputs of the detecting elements.

Since, in the present invention, the device is so arranged as to discriminate the presence or absence of the personal body by comparing the peak level and output time of the respective outputs of the infrared ray detecting elements with one another, there occurs no such malfunction even when the personal object approaches the detecting zone in any direction, as occurring in the known device of the differential output arrangement due to the mutual cancellation of the infrared ray detecting elements' outputs, and a highly reliable detection of the personal body can be realized.

Other objects and advantages of the present invention shall be made clear in following description of the invention detailed with reference to preferred embodiments shown in accompanying drawings.

BRIEF EXPLANATION OF DRAWINGS

FIGS. 14, 14A, 14B, 15A to 15D and 16A–16D are explanatory views for the embodiment of FIG. 13 respectively shown by outputs of the infrared ray detecting elements;

While the present invention shall now be explained with reference to the various embodiments shown in the accompanying drawings, it should be appreciated that the intention is not to limit the invention only to those embodiments shown, but to rather include all alterations, modifications and equivalent arrangements possible within the scope of appended claims.

DISCLOSURE OF PREFERRED EMBODIMENTS

Figures 1, 2, 3A, 3B, 3C:
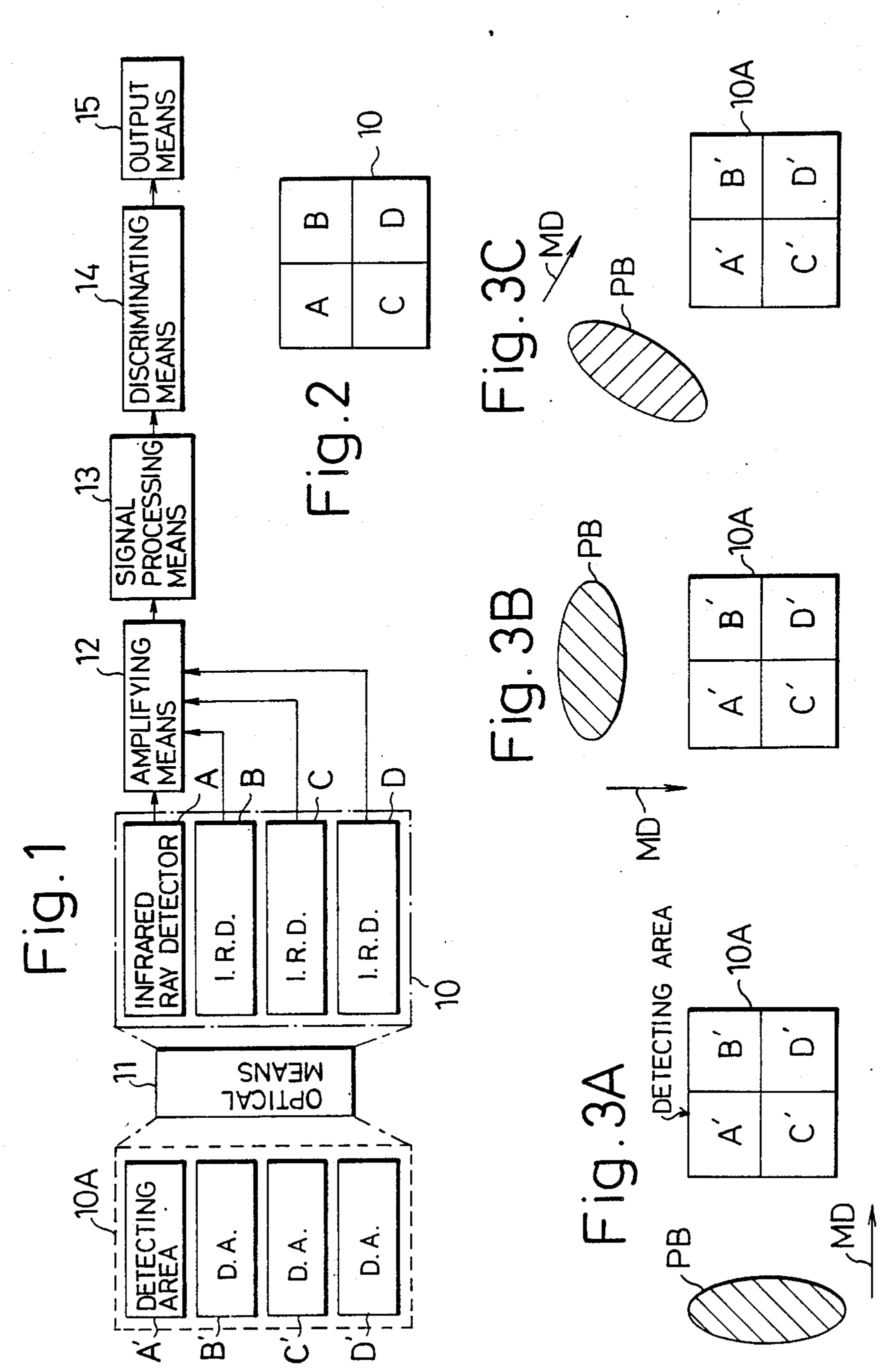
FIG. 1 is a block diagram showing the personal body detecting device in an embodiment of the present invention.
FIG. 2 is a schematic diagram showing a state in which infrared ray detecting elements are arranged in the device of FIG. 1.
FIGS. 3A to 3C are diagrams showing schematically various positional relationship of a personal body with respect to a detecting zone of the device of FIG. 1 and the personal body moving.

Referring here to FIG. 1, the personal body detecting device according to the present invention comprises a detecting element section 10 which includes a plurality of infrared ray detecting elements which are four denoted by A to D in the present instance and arranged in a lattice formation as shown in FIG. 2. These infrared ray detecting elements A to D in the detecting element section 10 formed through an optical means 11 formed by a multi-divided mirror, lens or the like, a detecting zone 10A comprising such lattice-shaped four detecting areas A′ to D′ as shown in FIG. 3. In practice, the detecting zone 10A is so designed as to allow a personal body PB to sequentially enter each of the four detecting areas A′ to D′ as the personal body PB passes through the zone 10A, while the four infrared ray detecting elements A to D are disposed on a focusing plane of the optical means 11. For these elements A to D, it is preferable to employ the pyroelectric elements which are inexpensive and operable at the normal temperature, while such other element as a thermopile and the like may also be employed.

The infrared ray detecting elements A to D provide outputs upon the presence of any change in temperature difference with respect to existing background in the detecting areas A′ to D′, the respective outputs are amplified independently of one another in an amplifying means 12 and are conveyed to a signal processing means 13 which comprises preferably a band pass filter, multiplexer and A/D converter, so that desired frequency components of the amplified outputs will be extracted as passed through the band pass filter and the desired frequency components will be sequentially A/D converted as passed through the multiplexer and A/D converter. The thus A/D converted outputs are provided to a discriminating means 14 which includes preferably a microcomputer, and are subjected to discriminations of peak level VA–VD in their wave-form and of output time tA–tD at which the A/D converted outputs exceed a level (refer to FIG. 4). Such discrimination outputs of the means 14 are provided through an output means 15 to be utilized for a monitor indication or an alarm.

Figure 4C:
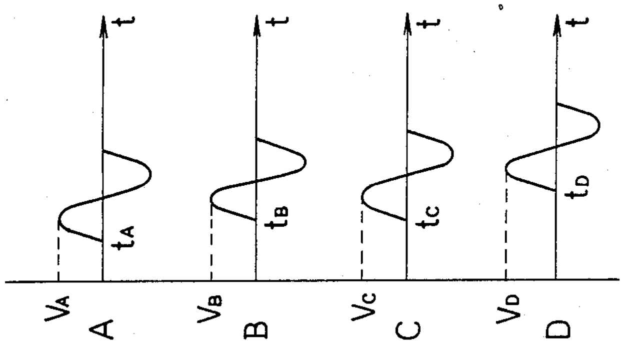
FIGS. 4A to 4C are wave-form diagrams of respective outputs of the infrared ray detecting elements upon such movement of the personal body as in FIGS. 3A to 3C.
Figure 4B:
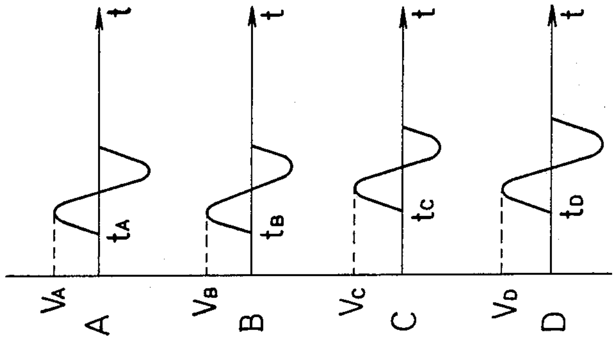
Figure 4A:
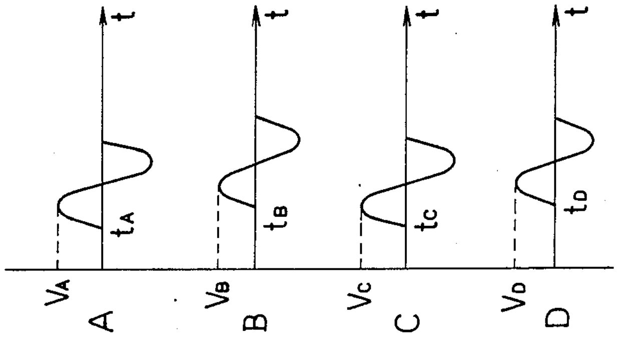

In the present invention, therefore, the detecting zone 10A comprising the detecting areas A′ to D′, that is, a watching or monitoring zone is set by means of the detecting element section 10 including the plurality of infrared ray detecting elements A to D, and the personal body passing through this zone can be detected out of the respective outputs of the infrared ray detecting elements A to D. More specifically, it is assumed here that the personal body PB has passed through the detecting zone 10A of the device according to the present invention, while moving in such different directions MD as shown in FIGS. 3A to 3C. Upon passing through the detecting zone 10A, the personal body PB is caused to present concurrently in all of the detecting areas A to D so that, as shown in FIGS. 4A to 4C, the infrared ray detecting elements A to D provide outputs respectively of wave forms having substantially the same peak levels VA to VD irrespective of the varying moving directions of the personal body PB, while these peak levels VA to VD show some extent of fluctuation depending on temperature distribution on the surface of the body PB or a difference in surface areas of parts of the detecting areas A′ to D′ occupied by the body PB. This fluctuation is so influenced by ambient temperature of the detecting areas that the peak level is elevated when the ambient temperature is low but is lowered when the latter is high, and the peak levels VA to VD are subjected to a relative comparison to one another in the present invention. Assuming here that the maximum level for the respective peak levels VA to VD is Vmax, a threshold level is to be set with the maximum level Vmax regarded as a reference, and it is made to discriminate that the personal body PB is present when all other peak levels exceed the threshold level. When a ratio between Vmax and the threshold level is made K (here $0<K<1$), the discrimination of the presence of the personal body with respect to other peak level Vi (i=A to D) is to satisfy a formula (1) as follows:

$$Vi/Vmax > K \quad (1)$$

When the personal body PB moves through all of the detecting areas A′ to D′, on the other hand, it is required for the body to spend a certain time to shift from one of the detecting areas to another detecting area, irrespective of the moving direction of the body, and such shifting time may be represented by a time difference in output time at which the respective outputs of the infrared ray detecting elements A to D rise. This time difference can be limited to a certain range by taking into consideration the size of the respective detecting areas and shifting velocity of the personal body. Assuming here that the shifting velocity of the personal body PB is in a range from S1 [m/sec] to S2 [m/sec], (S1<S2), an upper limit T2 [sec] of the time difference with respect to the lower limit velocity S1 can be determined, and a lower limit T1 [sec] with respect to the upper limit velocity S2 can be determined. When the time difference in the output time is made Δt, the discrimination of the personal body may be made when a formula (2) as follows is satisfied:

$$T1 < \Delta t < T2 \quad (2)$$

Provided that a time difference between the first output time and the last output time in the output waveforms of the respective infrared ray detecting elements A to D is to be taken, the time difference can be obtained as $\Delta t = tD - tA$ in any event of FIGS. 4A to 4C, and it becomes sufficient to determine whether or not this Δt satisfies the above formula (2).

Figure 5A:
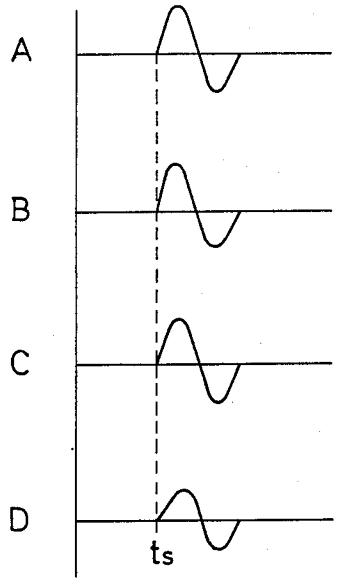
FIGS. 5A and 5B are wave-form diagrams of other outputs from the respective infrared ray detecting elements in the device of FIG. 1.
Figure 5B:
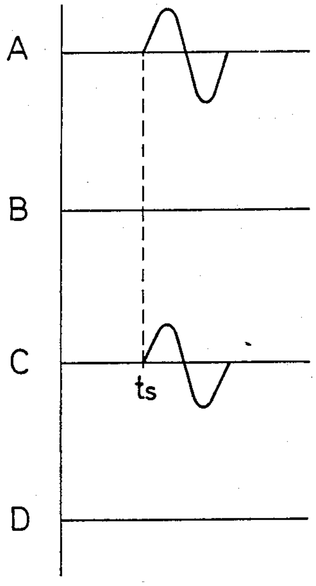

With the foregoing discriminating conditions carried out, it is made possible to prevent various malfunctions of the device from taking place. Upon occurrence of, for example, a temperature variation over the entire detecting zone including the all areas A′ to D′ or such disturbing light as sunlight, the infrared ray detecting elements A to D are to all generate the outputs substantially at the same time ts as seen in FIG. 5A, so that Δt does not satisfy the formula (2) so as to prevent any malfunction. In the event of a temperature change or disturbing light such as sunlight locally occurring in the detecting zone, the formula (2) is also not satisfied. Upon the local occurrence of the temperature change or disturbing sunlight only in the detecting areas A′ and C′, for example, of the detecting zone 10A, only the infrared ray detecting elements A and C provides outputs as shown in FIG. 5B so that Δt should not satisfy the formula (2) at all so as not to cause any malfunction. Upon presence of any internal noise, there is little possibility that enough output for satisfying the formulas (1) and (2) is induced from any of the infrared ray detecting elements A to D due to the internal noise, and the malfunction in this respect can be also reliably prevented.

Figure 6:
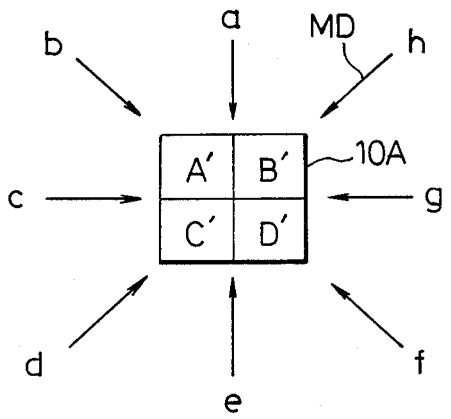
FIG. 6 is a schematic explanatory view of various moving directions of the personal body with respect to the detecting area in the device of FIG. 1.
Figure 8:
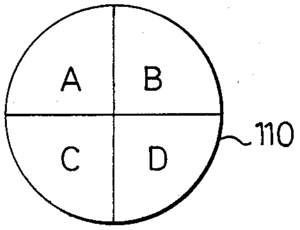
FIG. 8 is an explanatory view for another working aspect of the infrared ray detecting elements in the present invention.

As will be clear when FIGS. 6 and 7 are further referred to, the personal body PB passing through the detecting zone 10A in the respective directions a through h as shown in FIG. 6 causes the respective infrared ray detecting elements A through D to provide their outputs respectively as shown in FIGS. 7A through 7H at corresponding times tA through tD depending on the moving direction, in such that output providing sequence of the respective infrared ray detecting elements A to D varies in response to the moving direction of the personal body PB. In all of these cases, the foregoing formula (1) is satisfied, thereby the moving direction of the personal body PB can be discriminated in view of the output providing sequence of the elements A to D.

In the foregoing embodiment, the infrared ray detecting elements A to D have been referred to as having a rectangular light receiving surface, but the elements A to D may respectively be of a quarter sector shape in the light receiving surface and be arranged to form a circular light receiving surface as a whole when combined together.

Figure 9:
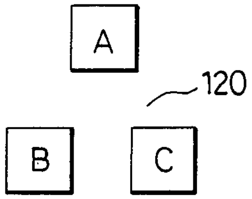
FIG. 9 is a diagram showing a state in which the infrared ray detecting elements are arranged in another embodiment of the device according to the present invention.
Figure 7A:
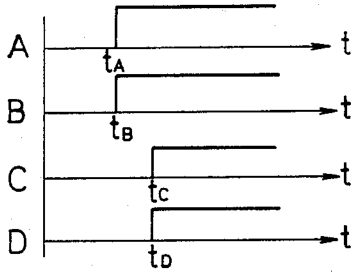
FIGS. 7A to 7H are wave form diagrams of the outputs of the respective infrared ray detecting elements, respectively upon movement in each of the various moving directions of the personal body as shown in FIG. 6.
Figure 7B:
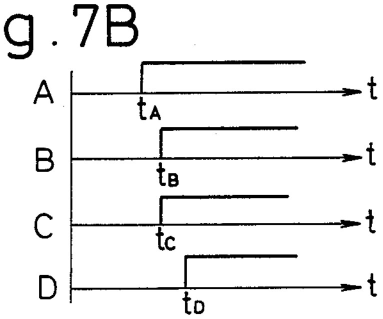
Figure 7C:
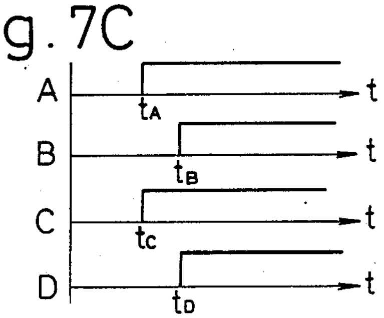
Figure 7D:
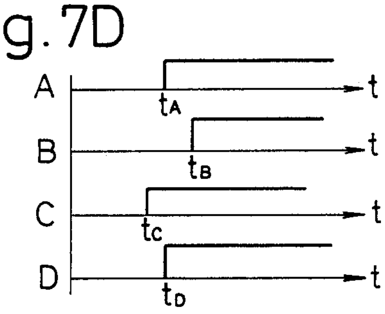
Figure 7E:
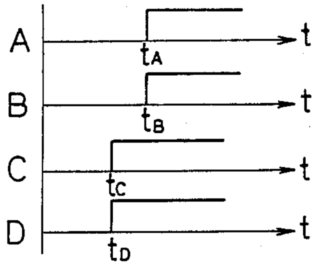
Figure 7F:
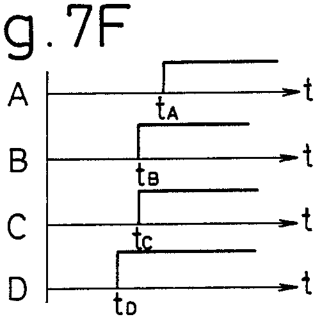
Figure 7G:
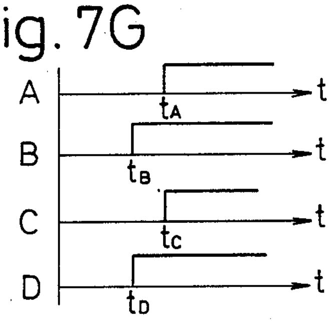
Figure 7H:
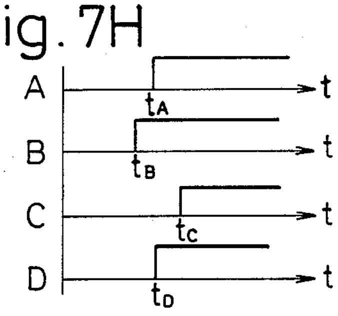
Figures 10A, 10B, 10C, 11A, 11B, 11C:
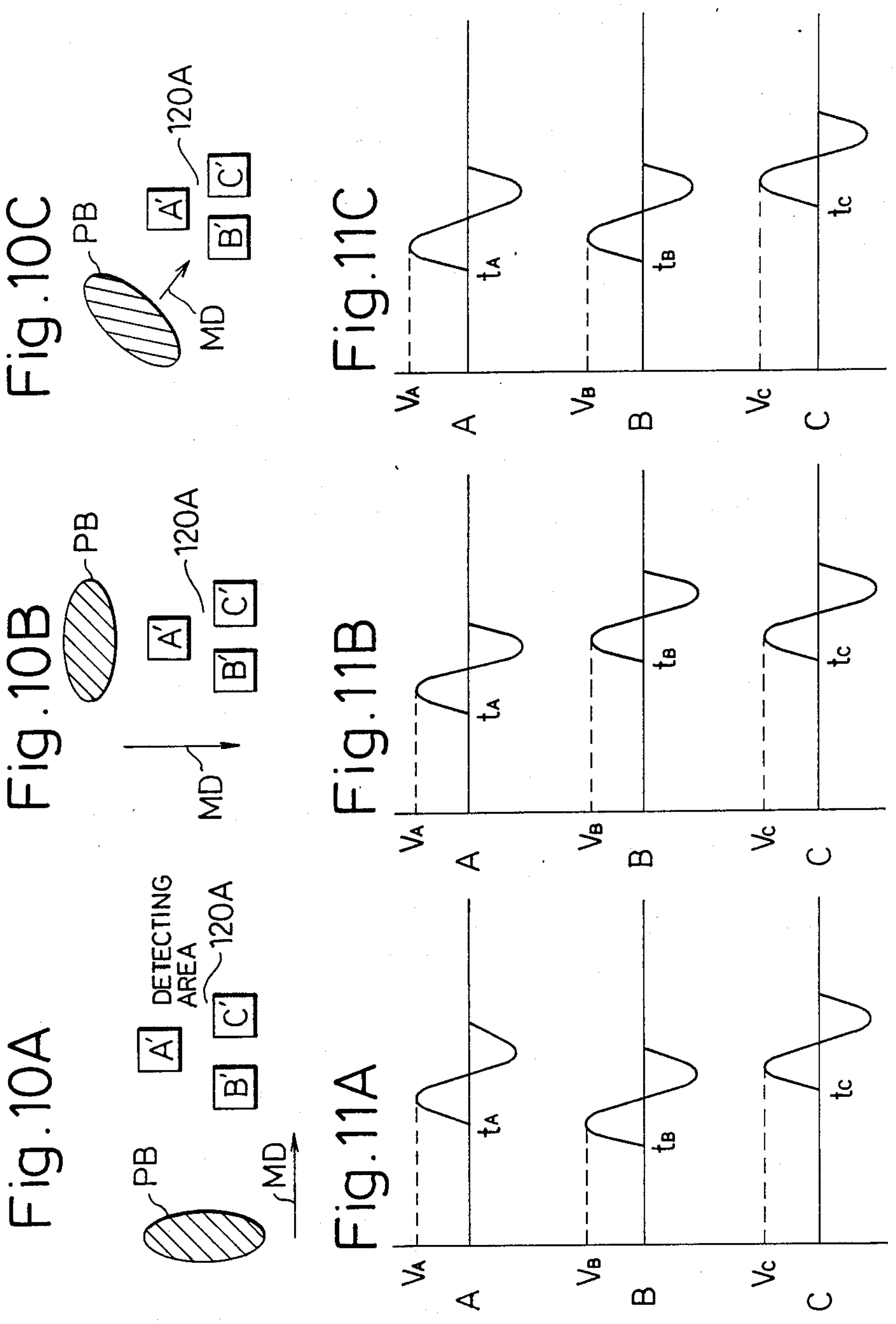
FIGS. 10A to 10C are diagrams showing positional relationship of the personal body moving in various directions with respect to the detecting zone in the case of the device of FIG. 9.
FIGS. 11A to 11C are wave-form diagrams respectively of the output of the infrared ray detecting elements, respectively upon movement in each of the various moving directions of the personal body as shown in FIGS. 10A to 10C.

While the foregoing embodiment has been disclosed as having four infrared ray detecting elements A to D. the number of these elements may properly be increased or decreased as required so that, as shown in FIG. 9, the device can be formed by such three of the infrared ray detecting elements A to C as shown in FIG. 9, for attaining substantially the same operation as in the foregoing embodiment. In this case, a detecting section 120 comprising the three infrared ray detecting elements A to C is arranged to have a triangular outline and, accordingly, a detecting zone 120A comprising detecting areas A′ to C′ of the three elements, as shown in FIGS. 10A to 10C are formed. Provided here that the personal body PB passes through such detecting zone 120A of the personal body detecting system in any of such moving directions MD as shown in FIGS. 11A to 11C, therefore, the elements' outputs of such waveforms having peak levels VA to VC as shown in FIGS. 11A to FIG. 11C are obtained. Assuming that the maximum level in the respective peak levels VA to VC is Vmax, then a threshold level is set with the maximum level Vmax made as a reference and the presence of the personal body PB is discriminated when all other peak levels exceed the threshold level, whereby it is made sufficient that, when a ratio of Vmax to the threshold level is made K and other peak level is Vi (i=A to C), the foregoing formula (1) is satisfied. Further, the presence or absence of the personal body PB can be discriminated depending on whether or not the time difference Δt between the respective output times tA to tC of the infrared ray detecting elements A to C satisfies the foregoing formula (2), and any malfunction due to the temperature change, disturbing light, internal noise or the like can be prevented.

For the three infrared ray detecting elements A to C, it may be possible to employ an element having a light receiving surface of one third sector shape, three of which are combined to form as a whole a circular light receiving surface.

Figure 12:
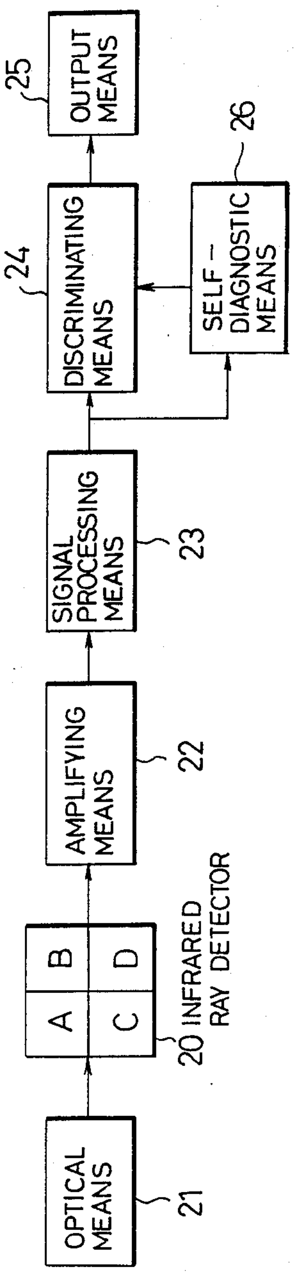
FIG. 12 is a block diagram showing another embodiment of the personal body detecting device according to the present invention.

Another feature of the present invention, provides a device which allows the presence or absence of the personal body to be reliably monitored even when one of the plurality of the infrared ray detecting elements has a problem causing it not to provide any output. Referring to FIG. 12 showing another embodiment of the device according to the present invention, a signal processing means 23 is connected to a discriminating means 24 and also to a self-diagnostic means 26 an output of which is provided to the discriminating means 24. That is, the self-diagnostic means 26 detects the absence of any one of the outputs from the infrared ray detecting elements due to such problems as damage, termination of life, circuitry abnormality and the like, detected results of which are provided to the discriminating means 24. In practice, the arrangement is so made that, in the self-diagnostic means 26, the outputs of the respective detecting elements are inspected during a preliminarily set time T. Provided that the output of one of the infrared ray detecting elements A to D exceeds a preliminarily set threshold level Vt during, for example, a time t (t<T), a counter corresponding to this detecting element is subjected to an increment, and this processing operation is sequentially carried out for the set time T with respect to each of other detecting elements. The respective counters corresponding to the infrared ray detecting elements are checked and, when one counter value is zero whereas another counter is of a value more than a predetermined, one of the infrared ray detecting elements which corresponds to the counter showing the zero value is discriminated to be not normally operating, that is, to be abnormal, the discrimination thus reached being provided to the discriminating means 24, responsive to which the means 24 ignores any output of the abnormal detecting element but utilizes only the outputs of remaining detecting element to confirm whether or not the foregoing formula (1) or (2) is satisfied, in other words, the presence or absence of the personal body in the detecting zone. In the embodiment of FIG. 12, other arrangements are the same as those in the embodiment of FIG. 1 the constituents of which are denoted by the same reference numerals but added by 10 as those in FIG. 1, and substantially the same functions as in FIG. 1 are realized.

Figure 13:
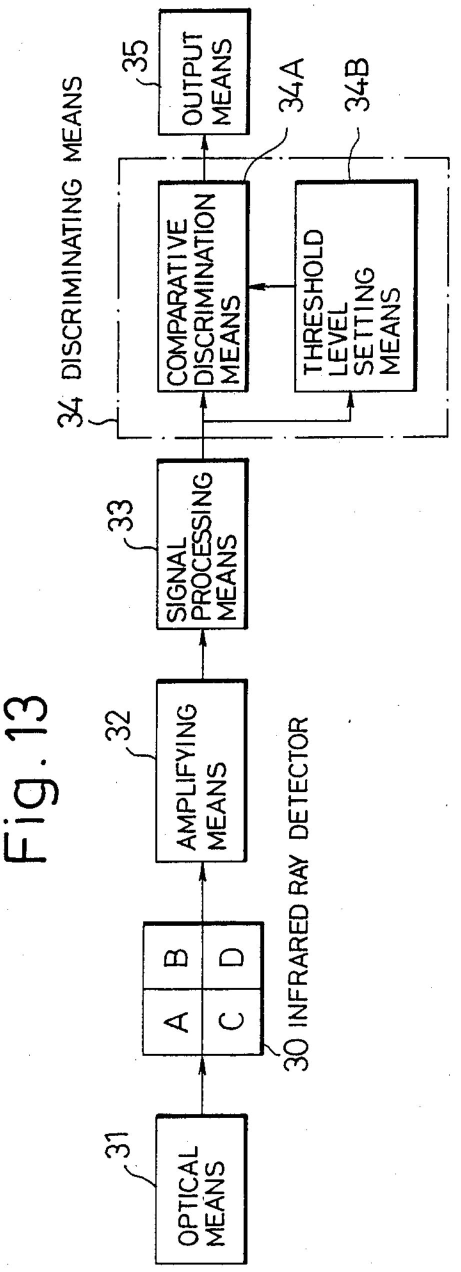
FIG. 13 is a block diagram showing still another embodiment of the present invention.
Figure 14A:
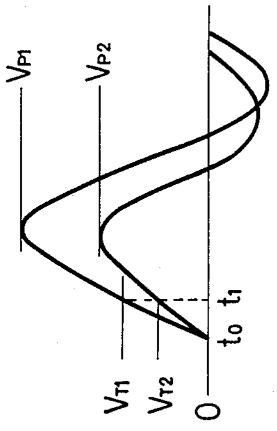
Figure 14B:
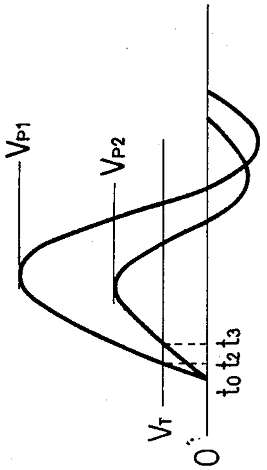
Figure 15A:
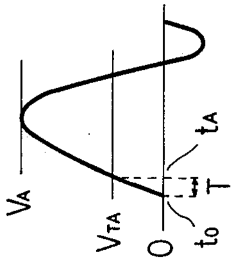
Figure 15B:
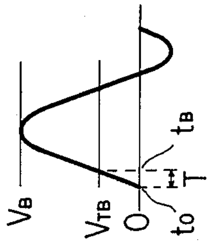
Figure 15C:
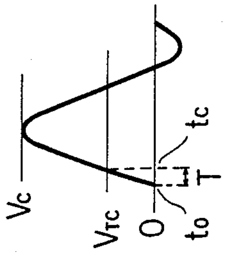
Figure 15D:
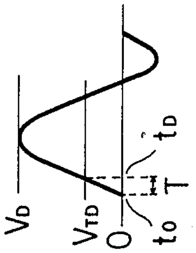
Figures 16A, 16B, 16C, 16D:
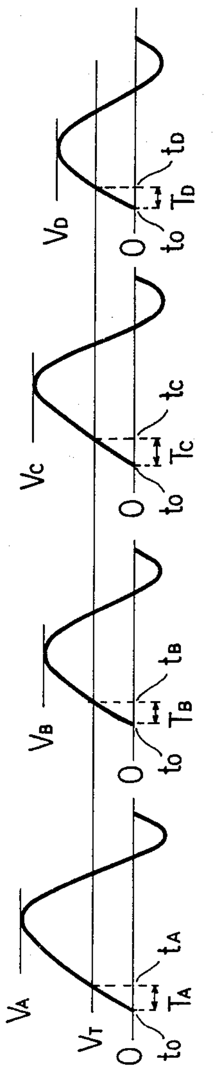

According to still another feature of the present invention, there is provided a device capable of reliably detecting the personal body without being influenced by any fluctuation in the sensitivity between the plurality of the infrared ray detecting elements. Referring to FIG. 13 showing another embodiment of the invention, a discriminating means 34 comprises a comparative discrimination means 34A and a threshold level setting means 34B. and the arrangement is so made that outputs of signal processing means 33 will be provided to the both means 34A and 34B in the discriminating means 34, while a threshold level is provided from the threshold level setting means 34B to the comparative discrimination means 34A. In the threshold level setting means 34B, any fluctuation in the peak level to be VP1 and VP2 as shown in FIG. 14A in respect of the output of the infrared ray detecting elements A to D processed at a signal processing means 33 causes the threshold level for the respective outputs to be set at such different levels as to be VT1 and VT2. That is, when the peak level is larger (VP1), the higher threshold level (VT1) is set whereas the lower peak level (VP2) causes the lower threshold level (VT2) to be set, and their rising time will be substantially the same at t3. When the peak levels of the output wave-forms of the respective detecting elements A to D are high as to be VA and VC as shown, for example, in FIGS. 15A to 15D, their threshold levels VTA and VTC are also made higher depending on the peak levels but, when the peak levels are lower as to be VB and VD, their threshold levels VTB and VTD are correspondingly lowered, whereby the duration T from signal input start point t0 to rising time tA through tD can be made constant. In an event where such a unique threshold level setting means as in the present embodiment is not provided, even such different peak levels VP1 and VP2 as in FIG. 14B are still at a single threshold level VT so that the rising times t2 and t3 from the signal input start point t0 are made different, that is, as shown in FIGS. 16A to 16D, there arises a fluctuation between the respective durations TA to TD from the signal input start point t0 to the respective rising times tA to tD.

Figure 17:
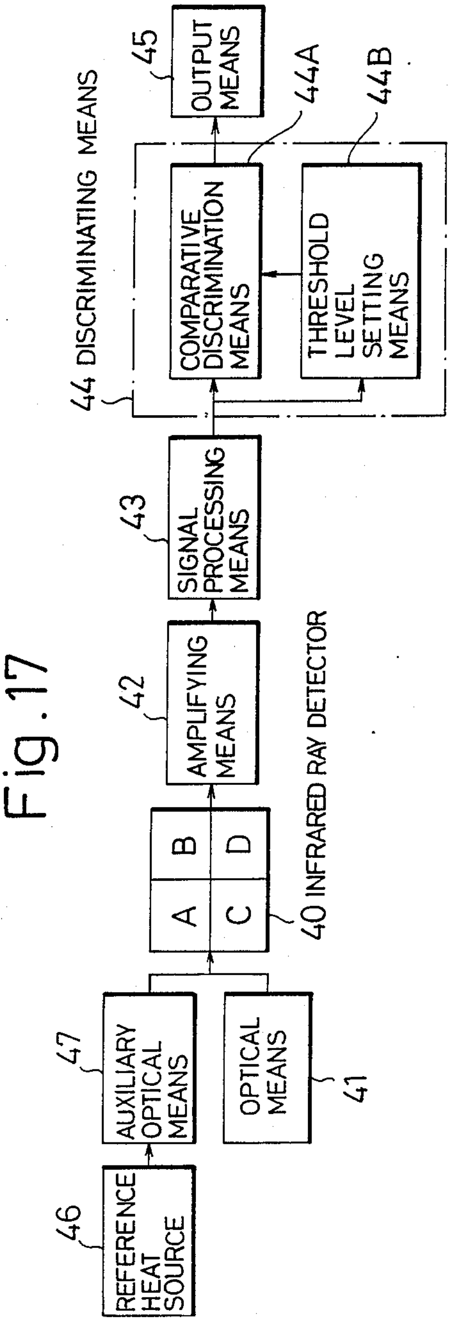
FIGS. 17 and 18 are block diagrams respectively of a further embodiment of the device according to the present invention.

In the comparative discrimination means 34A receiving the output from the threshold level setting means 34B, any fluctuation in the rising times tA to tD can be restrained even when the output wave-form peak levels of the infrared ray detecting elements A to D involve any fluctuation in respect of the element's sensitivity, so that it should be appreciated that the entire output times of the respective infrared ray detecting elements A to D are prevented from being made inaccurate due to the above fluctuation, but rather the respective elements' output times can be accurately detected, while the moving direction MD of the personal body PB can be discriminated at a high precision. In the embodiment of FIG. 13, further, other arrangements are the same as those in the embodiment of FIG. 1, and the same constituents as in the embodiment of FIG. 1 are denoted by the same reference numerals but added by 20, for attaining the same function as that in FIG. 1. Further, the device of FIG. 13 may be provided with a reference heat source 46 of nichrome wire or the like disposed in the device, and with an auxiliary optical means 47 for condensing infrared rays from the heat source 46, the arrangement being so made as to obtain the threshold levels VTA to VTD of the respective infrared ray detecting elements A to D by employing the infrared ray output of the reference heat source, so that any fluctuation in the peak levels due to environmental condition such as ambient temperature can be restrained, and the influence of sensitivity fluctuation in the elements A to D themselves can exclusively be corrected. In the embodiment of FIG. 17, too, the same constituents as in the embodiment of FIG. 1 are denoted by the same reference numerals but added by 30.

According to still another feature of the present invention, there is provided a device which allows the peak levels and output times of the infrared ray detecting element outputs accurately obtainable even when the signal processing means fluctuates in the bias value due to any drift caused in constituent parts by ambient temperature change. Referring to an embodiment shown in FIG. 18, a discriminating means 54 comprises a comparative discrimination means 54A and a bias value compensating means 54B, the arrangement being such that an output from a signal processing means 53 is provided commonly to the both means 54A and 54B, and renewed bias value is provided from the bias value compensating means 54B to the comparative discrimination means 54A. In this case, any optimum microcomputer may be employed for the discriminating means 54. More specifically, the bias value compensating means 54B of the discriminating means 54 formed by the microcomputer receives as an input first an A/D converted value VA1 of an output from the infrared ray detecting element A, which input is stored as a bias value BA in a memory RA of the means 54B. Following this, multiplexers in the signal processing means 53 are sequentially changed over, consequently further A/D converted values VB1, VC1 and VD1 of the respective outputs from the infrared ray detecting elements B, C and D are provided to the bias value compensating means 54B to be stored in the memories RB, RC and RD as bias values BB, BC and BD.

The multiplexers are further changed over to provide further output value VA2 of the infrared ray detecting element A to the discriminating means 54, where the value is compared at the comparative discrimination means 54A with the previously stored value VA1 in the bias value compensating means 54B, a difference between these values compared and determined to be smaller than a preliminarily set value Vth is provided to the memory RA to take an average value between the previous value VA1 and the new value VA2, and the bias value BA is renewed. Following this, the output values VB2, VC2 and VD2 of the detecting elements B, C and D are received and, similarly, the bias values BB, BC and BD are renewed. The same operation is repeated, a J-th input from the detecting element A causes a comparison between VA(J-1) and VAJ to be taken place, a difference between them and smaller than the set value Vth causes the average value provided as the input but, any difference exceeding the set value Vth does not cause the bias value BA not renewed. For the further detecting elements B to D, the same operation is repeated.

Figure 19:
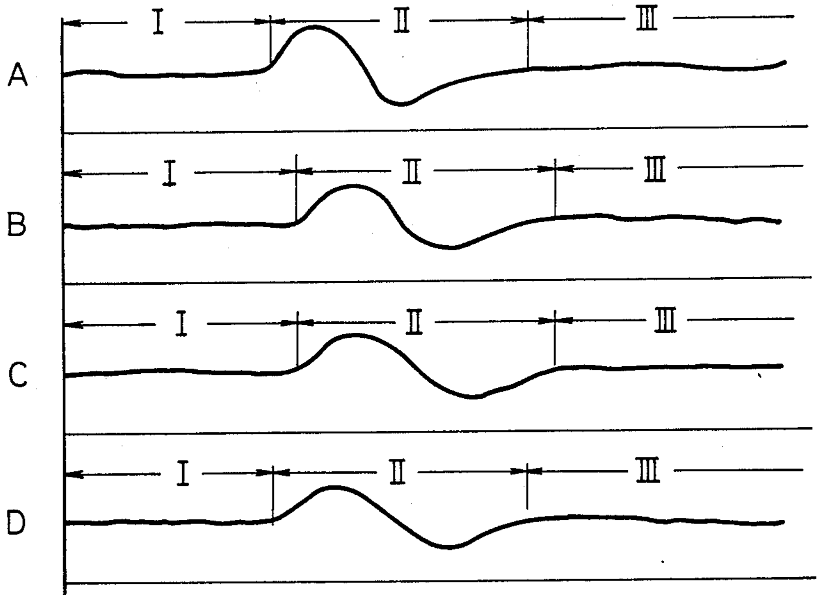
FIGS. 19 and 20 are wave-form diagrams for explaining the operation of the device shown in FIG. 18.
Figure 20:
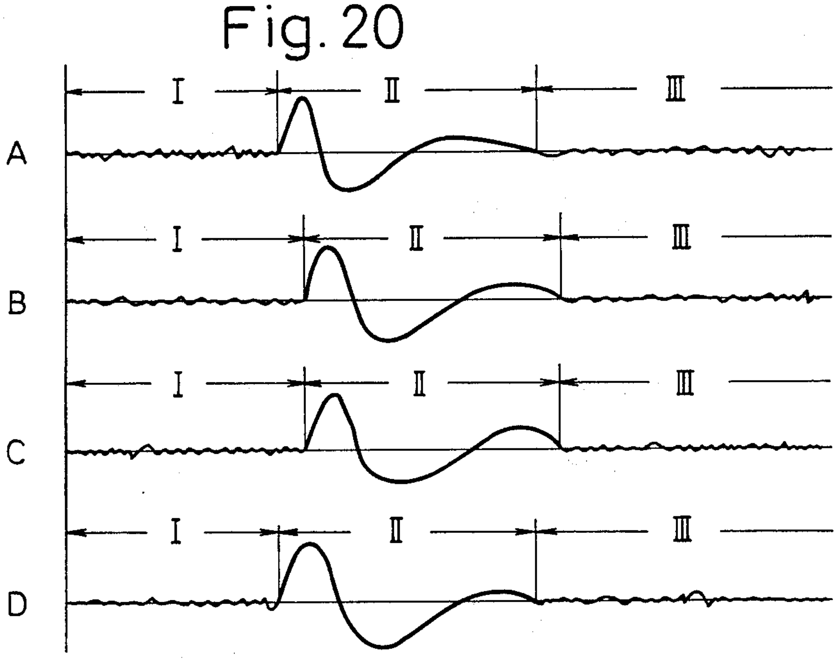

Accompanying the above, the peak levels VA to VD and output times TAA to TAD of the respective infrared ray detecting elements A to D are to be detected at the comparative discrimination means 54A on the basis of values which are obtained by subtracting from the output values of the elements A to D the bias values corresponding to the respective elements. More concretely, the detecting element outputs are caused to vary by the personal body PB passing through the detecting zone so that, as shown in FIG. 19, the outputs vary from a state in a section I immediately before entrance of the personal body into the detecting areas A' to D', to a state in next section II and, as the personal body separates from the areas, a state of a section III similar to that of the section I restores. In the present instance, the bias value is provided by means of the bias value compensating means 54B so that only variation components obtained by removing from the wave forms A to D of FIG. 19 the bias values BA to BD are provided as shown in FIG. 20, wherein the outputs A to D can be subjected to the restriction of any influence by the bias value fluctuation due to the drift and the like in the constituent parts.

Figure 18:
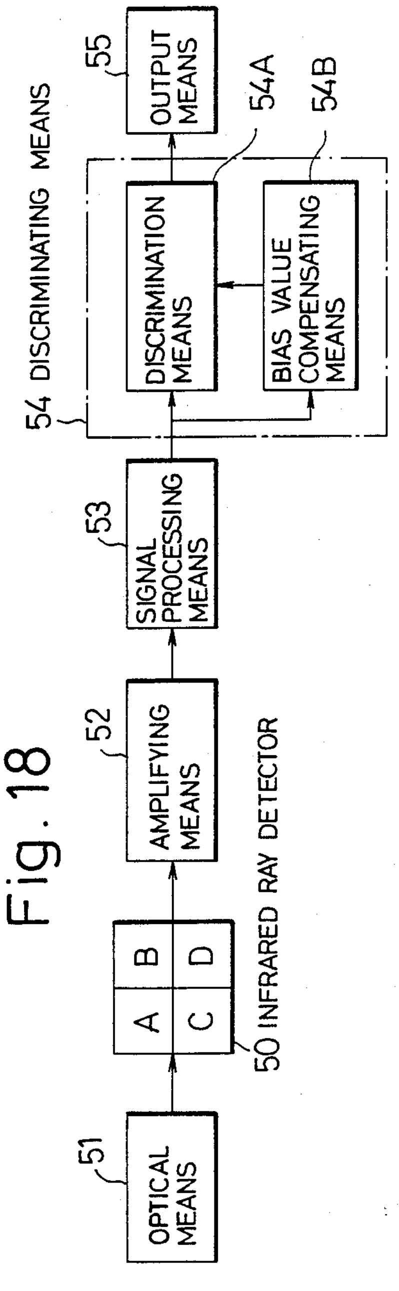

In the embodiment of FIG. 18, other arrangements are the same as those in the embodiment of FIG. 1 and the same constituents in FIG. 18 as those in FIG. 1 are denoted by the same reference numerals as in FIG. 1 but added by 40. With such arrangements and constituents, the same functions as in the embodiment of FIG. 1 are realized.

Figure 21:
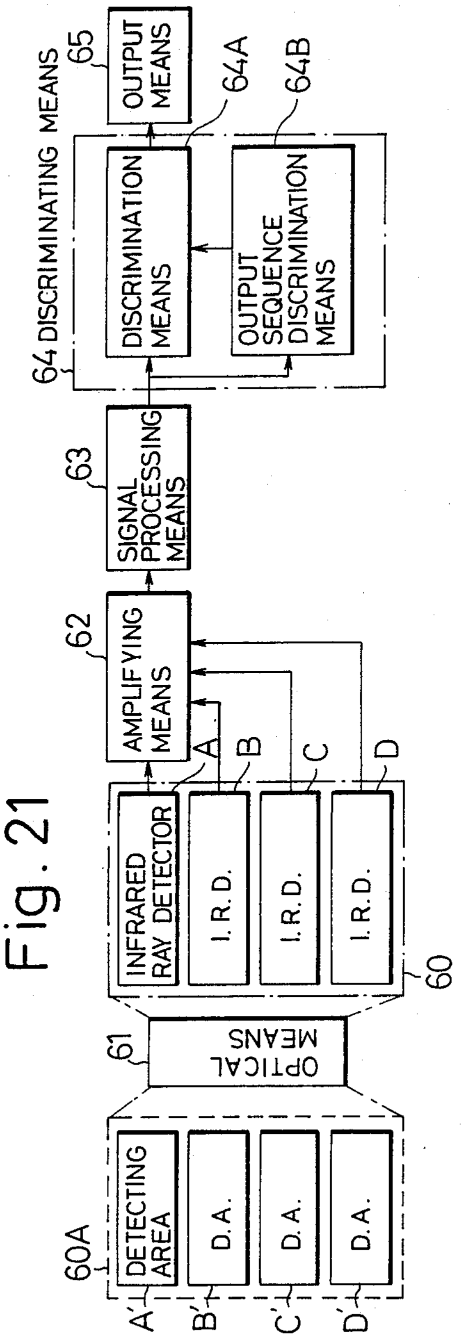
FIGS. 21 and 22 are block diagrams respectively showing yet another embodiment of the present invention.

According to still another feature of the present invention, there is provided a device which discriminates whether or not an output providing sequence of the infrared ray detecting elements A to D is due to the presence of personal body and sufficiently decreases any occurrence of erroneous detection. Referring to FIG. 21, a discriminating means 64 comprises a comparative discrimination means 64A and an output sequence discrimination means 64B, and a signal processing means 63 provides its output to the both means 64A and 64B while an output of the output sequency discrimination means 64B is provided to the comparative discrimination means 64A. As has been disclosed with reference to FIGS. 6 and 7 in respect of the embodiment of FIG. 1, the movement of the personal body in any one of the directions a through h with respect to the detecting zone should result in any one of such output modes dependent on the moving direction of the personal body as shown in FIGS. 7A to 7H. In the event of any other output sequence than those of FIG. 7, therefore, an object thus detected as passing through the detecting zone is discriminated as not to be a personal body, and this discriminated information is given to the comparative discrimination means 64A. So long as no detection output which denoting any other object than the personal body is provided from the output sequence discrimination means 64B, the comparative discrimination means 64A operates in the same manner as in the embodiment of FIG. 1, whereas in the event of the presence of detection output of other object than the personal body from the output sequence discrimination means 64B, any output to an output means 65 is blocked.

In the embodiment of FIG. 21, other arrangements are the same as those in the embodiment of FIG. 1, the same constituents as those in the embodiment of FIG. 1 are denoted by the same reference numerals as employed in FIG. 1 but as added by 50, and the same functions as in the embodiment of FIG. 1 are likewise realized.

Figures 22, 23A, 23B, 23C:
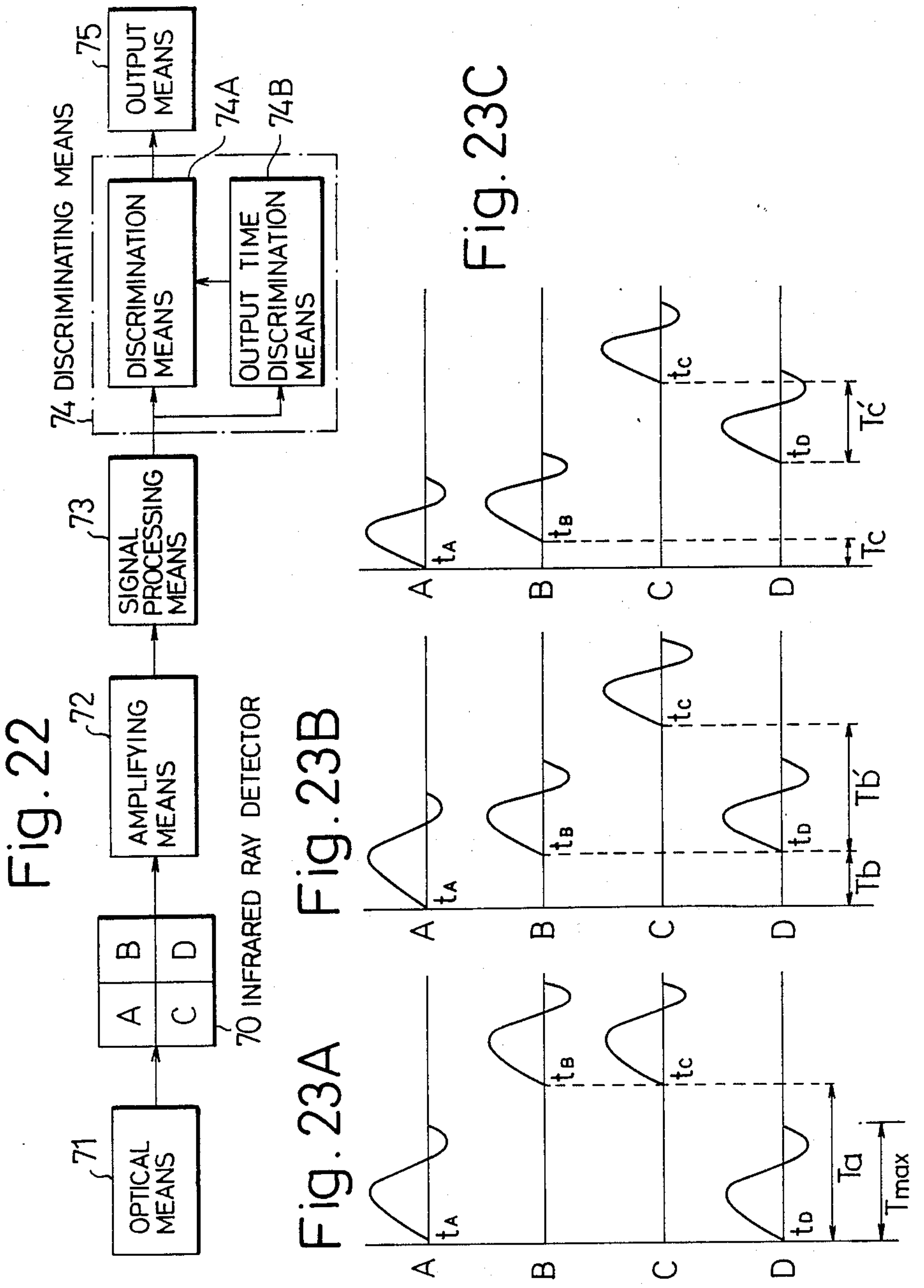
FIGS. 23A to 23C are wave-form diagrams showing abnormal output in the device of FIG. 21.

According to yet another feature of the present invention, there can be provided a device the detection precision of which is further elevated by the discrimination of the presence or absence of the personal body by taking into account not only the output sequence but also a difference in the output times. Referring to FIG. 22 showing an embodiment of this feature, a discriminating means 74 comprises a comparative discrimination means 74A and an output time discrimination means 74B, which are arranged so that an output of a signal processing means 73 is provided to the both means 74A and 74B, and an output of the output time discrimination circuit 74B is provided to the comparative discrimination means 74A. It should be appreciated that, so long as the operating state is as that referred to with reference to FIGS. 3 and 4 or 6 and 7 in respect of the embodiment of FIG. 1, the present embodiment operates also in the same manner. When, on the other hand, such outputs as shown in FIG. 23A are provided from the infrared ray detecting elements A to D and the time difference Ta between an output time tA or tD of the elements A and D and an output time tB or tC of the elements B and C is larger than the time difference Tmax at the output time when the personal body passes through the detecting areas A' to D' at the slowest speed, it is discriminated by the output time discrimination means 74B that the outputs are not due to the passing of the personal body, and the means functions to block any output provision from the comparative discrimination means 74A to an output means 75.

It should be assumed here that, as shown in FIG. 23B, the elements B and D have provided their outputs after a time Tb lapsed from the output time tA of the element A and the element C has thereafter provided its output after a time Tb' lapsed. So long as the personal body moves at a fixed speed, in the present instance, it should be satisfied that Tb=Tb' as will be clear from FIG. 7. The respective output times of the infrared ray detecting elements A to D involve on the other hand a fluctuation due to a fluctuation in the sensitivity between the respective elements A to D, coefficients $\alpha$ and $\beta$ are preliminarily set taking into account the above so that, when $\alpha Tb<Tb'<\beta Tb$ (wherein $0<\alpha<1<\beta$) is satisfied, the detection of personal body is discriminated but, when the above condition is not satisfied, the discrimination is so made as that no personal body is present and any output provision to the output means 75 is blocked. When, as shown in FIG. 23C, the personal body passes through the detecting zone so that the output times tA to tD of the detecting elements A to D are consecutive, that is, when the personal body comes in and out the detecting zone in a direction of clocks' hour hand at a quarter past eleven, it should be that Tc=Tc'. Because of the foregoing fluctuation in the output time, however, coefficients $\gamma$ and $\delta$ are preliminarily set so that, when $\gamma Tc<Tc'<\delta Tc$ $(0<\gamma<1<\delta)$ is satisfied, the detection of the personal body is discriminated but, when this condition is not satisfied, the discrimination is so made that no personal body has passed, and any output provision to the output means 75 is blocked.

In the embodiment of FIG. 22, other arrangements are the same as those in the embodiment of FIG. 1, the same constituents as those in the embodiment of FIG. 1 are denoted by the same reference numerals but as added by 60, and the device of this embodiment realizes substantially the same functions as those in the embodiment of FIG. 1.

Figure 24:
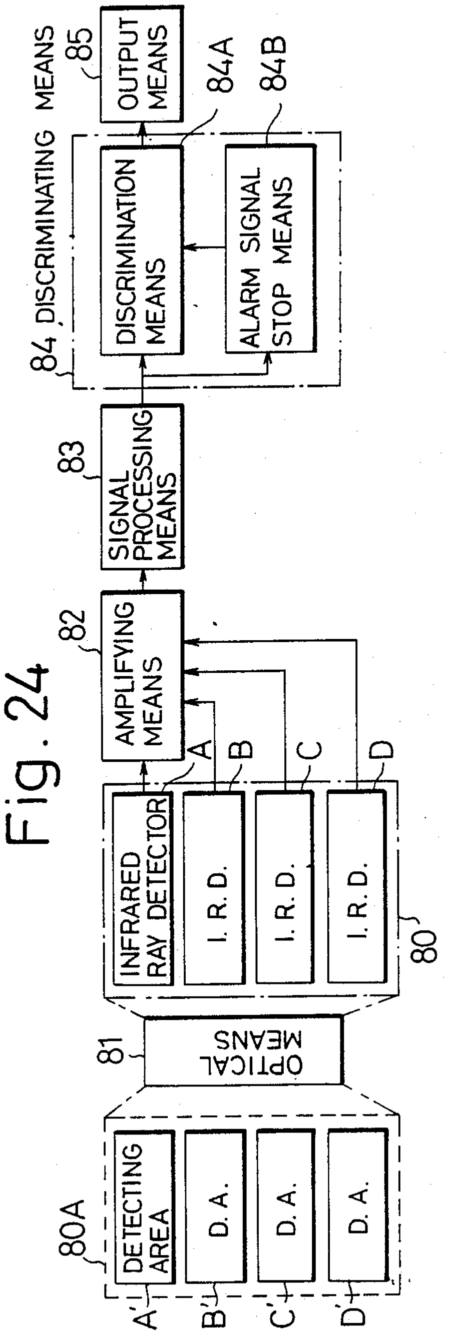
FIG. 24 is a block diagram showing still another embodiment of the present invention.
Figure 26:
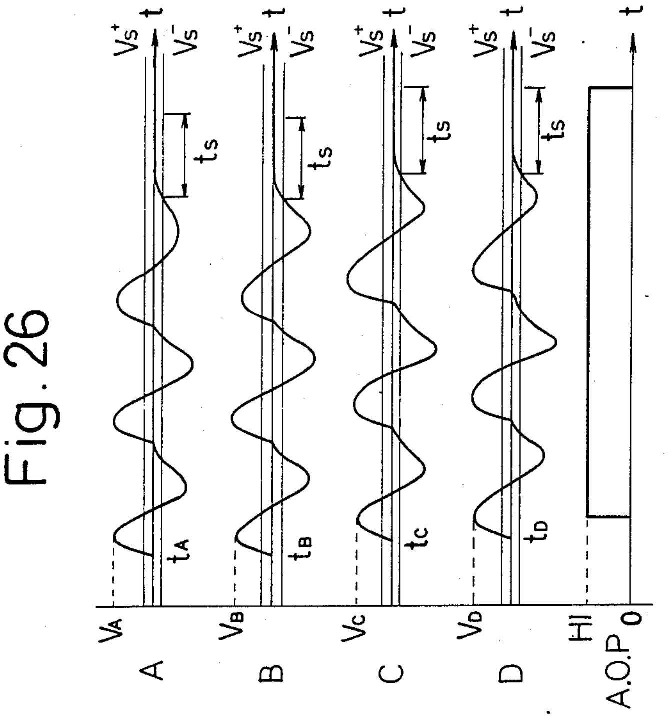
FIG. 26 shows in wave-form diagrams the operation of the device of FIG. 24.
Figure 25:
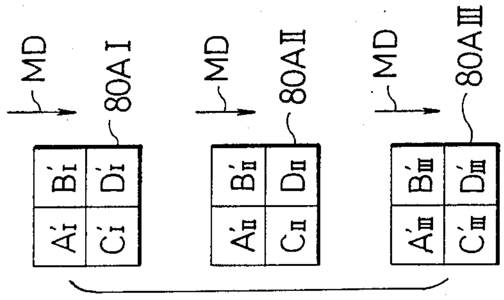
FIG. 25 is a diagram showing positional relationship of moving direction of the personal body with respect to a plurality of detecting zones according to the device of FIG. 24.

According to a still further feature of the present invention, there is provided a device which is arranged to block any output from a discriminating means 84 to an output means 85, in particular, any alarming output, so long as the respective outputs of the infrared ray detecting elements are in a predetermined range. Referring to FIG. 24 showing an embodiment of this feature, the discriminating means 84 comprises a comparative discrimination means 84A and an alarm signal stop means 84B, which are so arranged that an output of a signal processing means 83 is provided to the both means 84A and 84B while an output of the alarm signal stop means 84B is provided to the comparative discrimination means 84A. In the present instance, as shown in FIG. 25, the personal body detecting device includes a plurality of detecting zones 80AI, 80AII and 80AIII, for example, and the personal body is assumed to move consecutively in a fixed moving direction MD. When outputs as shown in FIG. 26 are present from the respective infrared ray detecting elements A to D and the output wave-form peak levels and rising times are satisfying the foregoing formulas (1) and (2), then the comparative discrimination means 84A provides to the output means 85 an alarm signal A.0.P. of a high level HI. Predetermined threshold levels $Vs^-$and $vs^+$are set for the respective outputs of the elements A to D, so that, when the outputs of the elements A to D are disposed in the threshold levels $Vs^{31}$ and $Vs^+$for a fixed time ts, the alarm signal stop means 84B discriminates that no personal body is present and so operates as to have the alarm signal stopped to be provided from the comparative discriminating means 84A to the alarm means 85. When new outputs are generated by the elements A to D and they satisfy the foregoing formulas (1) and (2), the alarm signal is again generated, as will be appreciated.

Other arrangements in the embodiment of FIG. 24 are the same as those in the embodiment of FIG. 1, the same constituents in FIG. 24 are denoted by the same reference numerals as in FIG. 1 but as added by 70, and substantially the same functions as those in FIG. 1 are realized.

Figure 27:
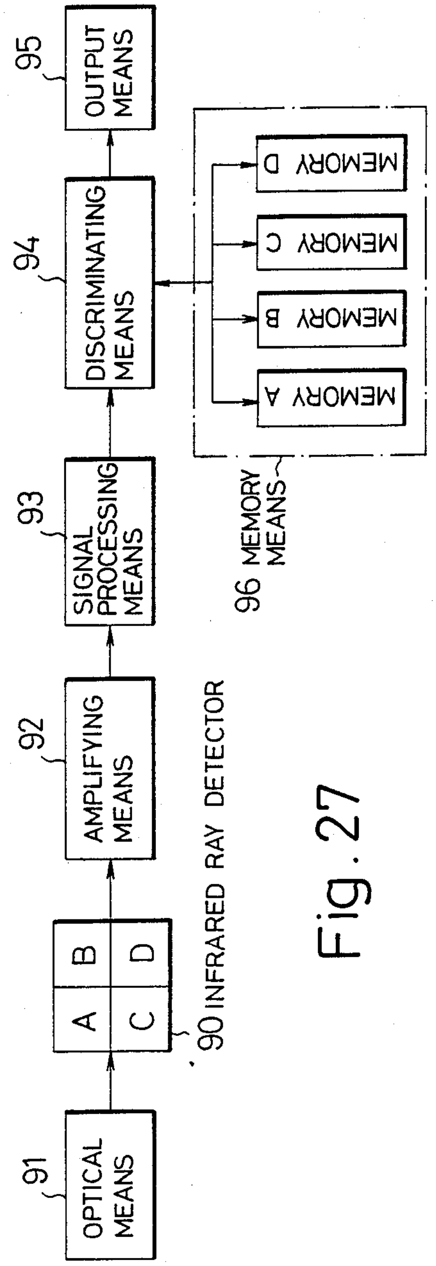
FIG. 27 is a block diagram showing a still further embodiment of the device according to the present invention.

According to a yet further feature of the present invention, there can be provided a device which is capable of restraining any malfunction even upon presence of an output due to a noise or the like immediately before the outputs due to the personal body detection by the infrared ray detecting elements A to D. Referring to FIG. 27 showing an embodiment of this feature, a discriminating means 94 includes a memory means 96 which comprises memories A to D for storing respectively the peak levels and output times in the waveforms of outputs from the respective detecting elements A to D. Provided here that a noise input is received by one of the detecting elements but an output due to this is below a predetermined level, the foregoing formula (1) is not satisfied and the discriminating means 94 does not discriminate this output to be of the personal body detection. In an event where the personal body has passed through the detecting zone upon such noise output generation, the respective elements provide detection outputs of a level exceeding the predetermined level but, when the outputs are provided from three of the elements after the noise output, the discriminating means 94 makes the discrimination of the presence or absence as well as the moving direction of the personal body upon receipt of four outputs including those from the three elements and the noise output, the latter of which not satisfying the formula (1), and it is discriminated that the personal body is absent. While the embodiment of, for example, FIG. 1 involves a risk that stored contents in the discriminating means 94 are caused to be cleared at this stage so that even a personal body detection output caused to be present at one of the detecting elements which has involved the noise output will be rendered as isolated data so as not to be eventually discriminated to be the personal body, the present embodiment of FIG. 27 holds the stored data of the respective outputs of the elements in the memories A to D of the memory means 96 until next inputs are received, so that the discrimination of the presence or absence of the personal body can be carried out at a state where the detection outputs exceeding the predetermined level are received from all of the detecting elements A to D.

Other arrangements in the embodiment of FIG. 27 are the same as in the embodiment of FIG. 1, the same constituents as those in FIG. 1 are denoted by the same reference numerals but as added by 80, and substantially the same functions as those in FIG. 1 are realized.

What we claim as our invention is:

1. An infrared intrusion detector with a plurality of infrared detecting elements comprising:

an optical means for condensing infrared rays from a detecting zone, the detecting zone comprising a plurality of divided areas corresponding to each of said infrared ray detecting elements respectively, wherein said respective infrared detecting elements receive the condensed infrared rays from each of the divided detecting areas;

amplifying means for amplifying outputs from said respective infrared ray detecting elements;

signal processing means connected to said amplifying means for processing the amplified outputs and deriving respective output signals;

discriminating means connected to said signal processing means for comparing peak levels and times of the amplified outputs using the output signals from said signal processing means and thereby discriminating between the presence or absence of a personal body in the detecting zone, wherein the difference in time between any two of the amplified outputs is compared to determine whether or not the time difference is within a predetermined range; and output means for receiving a signal from said discriminating means denoting the presence of a personal body in the detecting zone.

2. A device according to claim 1, wherein said discriminating means obtains the maximum level of the peak levels in the outputs of each of said infrared ray detecting elements for discriminating between the presence or absence of a personal body when the peak levels of more than a predetermined number of other outputs than those of the maximum level are above a predetermined ratio with respect to the maximum level.

3. A device according to claim 2, wherein said discriminating means additionally comprises a memory means having a plurality of memories corresponding to said plurality of respective infrared ray detecting elements, said plurality of memories continuously holding the peak levels and the times of the outputs of said infrared ray detecting elements, respectively, said discriminating means using the stored contents in said memories for discriminating between the presence or absence of a personal body.

4. A device according to claim 1, wherein said infrared ray detecting elements comprise four infrared ray detecting elements arranged in a two dimensional relationship.

5. A device according to claim 1, wherein said infrared ray detecting elements comprise three infrared ray detecting elements arranged in a two dimensional relationship.

6. A device according to claim 1, wherein said discriminating means determines sequence of outputs of said plurality of infrared ray detecting elements for discriminating the direction said personal body moves.

7. A device according to claim 1, additionally comprising a self-diagnostic means to determine abnormal output of any of said infrared ray detecting elements, and said means for discriminating between the presence of absence of a personal body operates only on the basis of normal outputs of the other infrared ray detecting elements.

8. A device according to claim 1, wherein said discriminating means sets threshold levels for determining the times of the outputs of said infrared ray detecting elements in accordance with the peak levels thereof.

9. A device according to claim 1, wherein said discriminating means comprises means for storing the output signals from said signal processing means when any variation in the output signals of said signal processing means is smaller than a preliminarily set variation component and calculating therefrom a bias value, and for compensating the output signals of said signal processing means with the bias value for the output variation when the variation is larger than the preliminary set variation component.

10. A device according to claim 1, wherein said discriminating means comprises a sequence discrimination means which discriminates between the presence or absence of a personal body depending on the sequence in which the outputs of said infrared ray detecting elements rise.

11. A device according to claim 1, wherein said discriminating means comprises means for blocking the output signal to said output means when the time difference between any two of the outputs from said infrared ray detecting elements exceeds a predetermined time.

12. A device according to claim 1, wherein said discriminating means comprises means for blocking an alarm output to said output means when the outputs of said infrared ray detecting elements are within a predetermined range for a predetermined time.

13. A device according to claim 1, wherein said discriminating means additionally comprises a memory means having a plurality of memories corresponding to said plurality of respective infrared ray detecting elements, said plurality of memories continuously holding the peak levels and the times of the outputs from said infrared ray detecting elements, respectively, said discriminating means using the stored contents in said memories for discriminating between the presence or absence of a personal body.

14. A device according to claim 2, wherein said discriminating means comprises means for blocking an alarm output to said output means when outputs of said infrared ray detecting elements are within a predetermined range for a predetermined time.

15. A device according to claim 2, wherein said infrared ray detecting elements comprise four infrared ray detecting elements arranged in a two dimensional relationship.

16. A device according to claim 2, wherein said infrared ray detecting elements comprise three infrared ray detecting elements arranged in a two dimensional relationship.

17. A device according to claim 2, wherein said discriminating means determines sequence of outputs of said plurality of infrared ray detecting elements for discriminating the direction a personal body moves.

18. A device according to claim 2, additionally comprising a self-diagnostic means to determine any abnormal output of any of said infrared ray detecting elements, and said means for discriminating between the presence of absence of a personal body operates only on the basis of normal outputs of the other infrared ray detecting elements.

19. A device according to claim 2, wherein said discriminating means sets threshold levels for determining the times of the outputs of said infrared ray detecting elements in accordance with the peak levels thereof.

20. A device according to claim 2, wherein said discriminating means comprises means for storing the output signals from said signal processing means when any variation in the output signals of said signal processing means is smaller than a preliminarily set variation component and calculating therefrom a bias value, and for compensating the output signals of said signal processing means with the bias value for the output variation when the variation is larger than the preliminarily set variation component.

21. A device according to claim 2, wherein said discriminating means comprises a sequence discrimination means which discriminates between the presence of absence of a personal body depending on the sequence in which the outputs of said infrared ray detecting elements rise.

22. A device according to claim 2, wherein said discriminating means comprises means for blocking the output signal to said output means when the time difference between any two of the outputs from said infrared ray detecting elements exceeds a predetermined time.

* * * * *